United States Patent Office 2,737,676
Patented Mar. 13, 1956

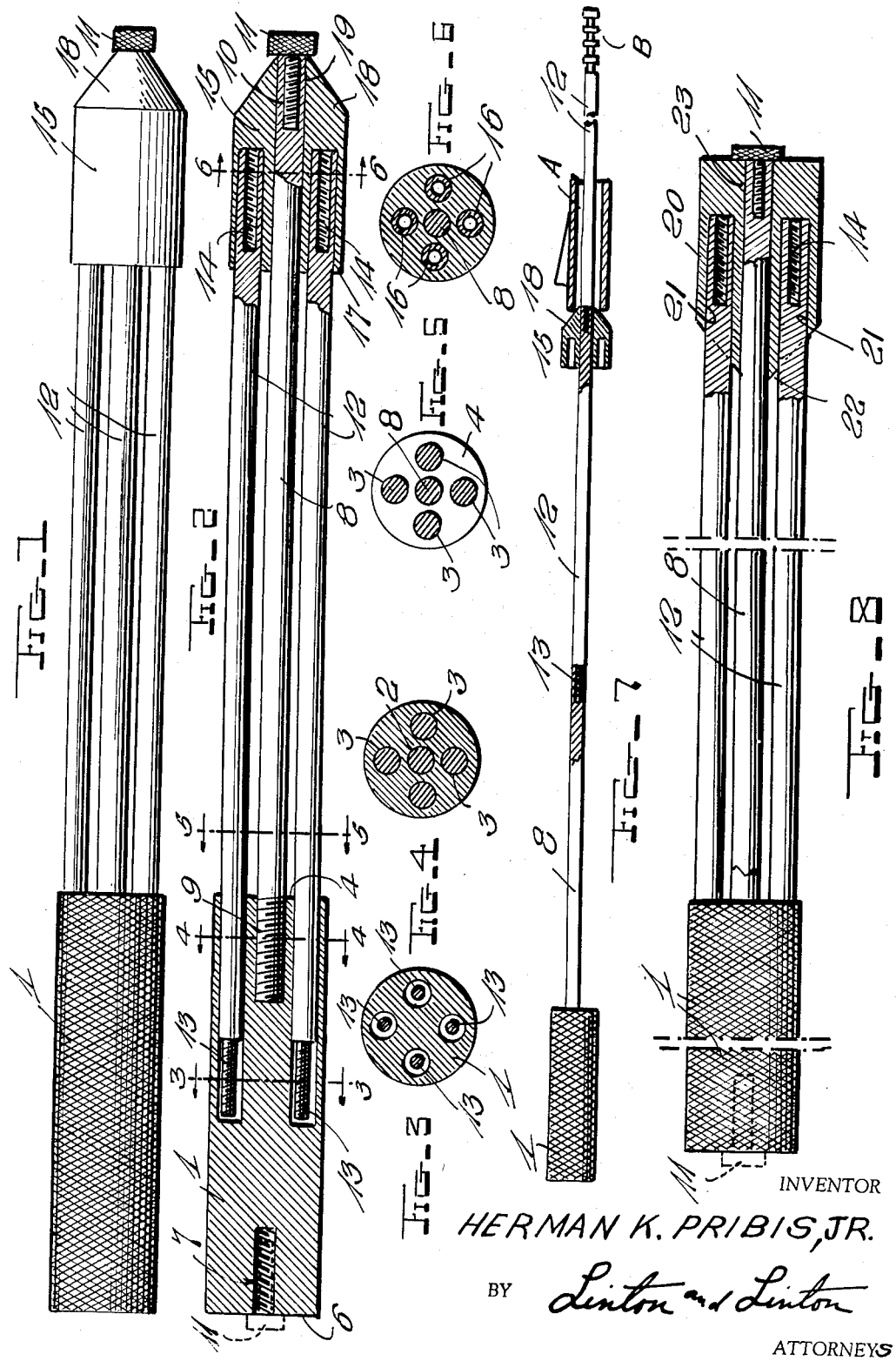

2,737,676

SELF-STORING TOOL FOR SMALL ARM WEAPONS

Herman K. Pribis, Jr., Scotia, N. Y.

Application October 18, 1954, Serial No. 462,810

4 Claims. (Cl. 15—104.165)

The present invention is concerned with a tool for cleaning, oiling and repairing the bores of gun barrels and is more particularly directed to a manually operable self-storing tool for use with various caliber small arms, either manually held or shoulder fired weapons.

The principal object of the present invention is to provide a rod which can be reciprocated throughout the entire length of a muzzle of a barrel bore without injury thereto and yet which rod can be quickly and easily disassembled and retained into a self-storing unit of a relatively small length.

A further and important object of the present invention is to provide a tool which is firmly guided and properly centered when applied to the muzzle of a barrel with the rod carrying cleaning material, oiling material or barrel bore maintenance or repair implements throughout the length of the bore of the barrel and which tool can be so applied to all small arms regardless of the caliber of the bore thereof.

A still further object of the invention is to provide a sectionalized barrel bore maintenance and repair tool which has a means for centering and guiding said tool during its operations and which centering means also can be employed for retaining the sections of the tool in conjunction with the tool handle into a self-storing unit of relatively small size.

In the following detailed description of the accompanying drawing, further objects of the invention will be in part pointed out and in part obvious. In the drawings:

Fig. 1 is a side elevation of the present tool in its stored arrangement.

Fig. 2 is a longitudinal section of Fig. 1.

Fig. 3 is a cross section taken on line 3—3 of Fig. 2.

Fig. 4 is a further cross section taken on line 4—4 of Fig. 2.

Fig. 5 is a still further cross section taken on line 5—5 of Fig. 2.

Fig. 6 is an additional cross section taken on line 6—6 of Fig. 2.

Fig. 7 is a reduced side elevation of the present tool as applied to a gun barrel simulating a use thereof; and Fig. 8 is a side elevation partly in section of a modified form of the present tool.

Referring now more particularly to the accompanying drawings wherein like and corresponding parts are designated by similar reference characters, numeral 1 refers to knurled cylindrical handle of the present tool which has an axially extending threaded recess 2 surrounded by a plurality of cylindrical recesses 3 opening into the relatively flat end face 4 thereof. The opposite substantially flat end face 6 of said handle also has an axially extending threaded recess 7 therein.

A rod section 8 having a threaded end periphery 9 is screwed into recess 2 for being connected to handle 1 and thereby extends longitudinally of said handle. The opposite end of rod section 8 has a threaded recess 10 which during the storage of the present tool contains a large headed screw 11 in threaded engagement therewith.

A plurality of additional rod sections 12 each having a reduced threaded end portion 13 forming a male member and a threaded recess 14 in the opposite end thereof forming the female member capable of receiving the male member of one of the rod sections when arranged in a series for forming an extended rod. One of said rod sections 12 is ribbed or otherwise formed as indicated at B in Fig. 7 for retaining a cleaning or oiling cloth or for carrying a bore maintenance tool of conventional design. One of said ends 13 can be mounted within recess 10 of rod section 8 when screw 11 is removed and placed in recess 7 as indicated in dotted lines in Fig. 2.

A rod guide and centering member 15 has a plurality of recesses 16 formed in the base thereof and extending longitudinally of said member which is of a cylindrical configuration, but with a truncated conical head 18. Member 15 further has an axial bore 19 extending therethrough of a size for slidably receiving rod sections 8 and 12 therethrough with said bore 19 opening at the apex of head 18.

In Fig. 8 there is shown a modified form of the present tool which is the same as that hereinbefore described, except that in lieu of the guide member 15, there is employed a guide member 20 having a plurality of cylindrical longitudinally extending recesses opening into the conical head 22 of said member. An axial bore 23 extends completely through said member substantially parallel to said recesses 21.

The present tool when being stored has the rod sections 12 unscrewed from one another and from rod section 8 whereupon one end of said sections 12 can be slidably inserted within recesses 3 with their opposite ends slidably inserted within recesses 16 of the guide member 15. Rod section 8 is caused to extend through bore 19 and said rod section is of such a length that it just extends beyond the apex of the head of member 15 when said member is moved towards handle 1, the distance allowed by rod sections 12. Screw 11 is then engaged in recess 10 retaining all of the elements in the position shown in Figs. 1 to 6 of the drawings.

When employing the guide member 20 then the ends of said rod sections are inserted within recess 21 and through bore 23 whereupon the screw 11 can then be inserted in recess 10. In this manner the conical head 22 is protected against possible injury inasmuch as the same is finely machined at substantially an angle of 30 to 80° relative to the axis of the guide member.

By removing screw 11 from rod section 8, guide members 15 and 20 can be slid from rod section 8 whereupon sections 12 can be joined by screwing an end 13 in a recess 14 of an adjacent section and in recess 10. As a result an elongated rod is formed as shown in Fig. 7. Said rod is slidable through bore 19 or 23 of the centering members and with the heads 18 or 22 which is touching the peripheral mouth of the muzzle of the barrel A, said heads will automatically align the rod so that it is properly centered in the bore of the barrel. By reciprocating handle 1, rod end B is likewise reciprocated in the barrel bore and prevented from contacting the rifling thereof or damaging the surface of the wall of the bore as the centering device 15 or 20 will guide said rod and prevent its contacting the wall of the bore. Further, the conical configuration of the heads 18 and 22 will fit any muzzle regardless of the caliber thereof, but without contacting the rifling so as to possibly injure the same. Thus, by the use of the present tool, gun barrel bores can be maintained and repaired without detriment to the fine finish therein.

The present tool is capable of considerable modification and such changes thereto as come within the scope of the appended claims is deemed to be a part of the invention.

I claim:

1. A self-storing tool for guiding and moving gun barrel bore maintenance devices comprising a handle having a plurality of recesses provided in one end thereof with one of said recesses having threads therein, a plurality of rod sections capable of being interconnected forming a single elongated rod, one of said rod sections being in threaded engagement with said handle thread recess, a guide member provided with a bore for slidably receiving said rod section when assembled therethrough, a plurality of recesses provided in the face thereof opposite said handle recesses and a cone-shaped end portion, said handle attached rod section when detached from the remaining rod section solely extending through said guide member bore, the remainder of said rod sections being capable of being positioned when disassembled each in and between one of said handle recesses and one of said guide member recesses and means for detachably retaining said guide member in position on said handle attached rod section for storing said remaining rod sections between said handle and said guide member.

2. A self-storing tool for guiding and moving gun barrel bore maintenance devices comprising a cylindrically shaped handle having a flat base, said handle base having a plurality of recesses provided therein whose axes extend longitudinally of said handle, said handle base having a central threaded recess, a rod section having one end in threaded engagement with said threaded handle recess, a cylindrical guide member having a flat base and a truncated cone-shaped head, said member having a central axially extending bore, said member further having a plurality of recesses in the base thereof positioned opposite said handle recesses extending substantially parallel to said bore, a plurality of rod sections capable of being interconnected and attached to said first mentioned rod section forming a single extended rod slidably positioned through said member bore, and when disassembled each positioned in one of said handle and member recesses spacing the same apart, said first mentioned rod section being capable of extending through said member bore when said remaining sections are in said recesses and means for detachably retaining said member on said first-mentioned rod section with the remaining rod sections retained in said recesses for storage purposes.

3. A self-storing tool as claimed in claim 2, wherein said first-mentioned rod section is permitted to extend through said member to the truncated end thereof by said remaining rod sections when in their storage position and said retaining means is a large head screw detachably mounted in said first-mentioned rods free end and tightened against said member truncated end portion.

4. A self-storing tool for guiding and moving gun barrel bore maintenance devices comprising a handle having a plurality of recesses provided in one end thereof, a rod extending from said handle recessed end, a guide member having a cone shaped end portion, said guide member having a plurality of recesses extending into said cone shaped end portion and an axial bore therethrough opening at the apex of said end portion, a plurality of rod sections capable of being interconnected and connected to said rod for forming an elongated rod slidable through said member bore and when disconnected each positioned with an end in one of said handle recesses and an opposite end in one of said member recesses while extending therebetween for storage purposes and means connected to said rod for detachably retaining said member and said rod sections in their storage position.

References Cited in the file of this patent

UNITED STATES PATENTS

| 602,937 | Egli | Apr. 26, 1898 |
| 1,499,460 | Kennedy | July 1, 1924 |

FOREIGN PATENTS

| 50,381 | Switzerland | Dec. 10, 1910 |
| 70,458 | Switzerland | May 3, 1915 |